United States Patent Office 3,682,850
Patented Aug. 8, 1972

3,682,850
CELLULOSIC ESTERS OF TWO ORGANIC ACIDS BLENDED WITH A COPOLYMER OF ETHYLENE AND AT LEAST ONE ETHYLENICALLY UNSATURATED ESTER OF A SATURATED FATTY ACID
John Stuart Coates, Houston, Tex., assignor to E. I. du Pont de Nemours and Company, Wilmington, Del.
No Drawing. Filed July 30, 1970, Ser. No. 59,677
Int. Cl. C09d 3/76
U.S. Cl. 260—17 R    17 Claims

ABSTRACT OF THE DISCLOSURE

A thermoplastic composition capable of forming compatible films comprising a blend of a cellulosic ester of two organic acids with a copolymer of ethylene and at least one ethylenically unsaturated ester of a fatty acid, a lacquer comprising an organic solvent solution of the composition, and a material having the composition coated thereon are provided.

BACKGROUND OF THE INVENTION

Field of invention

This invention relates generally to novel cellulosic ester compositions, and, more particularly, to cellulosic esters of two organic acids blended with a copolymer of ethylene and at least one ethylenically unsaturated ester of a saturated fatty acid.

Description of prior art

Cellulosic esters of at least two organic acids such as cellulose acetate butyrate and cellulose acetate propionate are well known and have a wide variety of uses. For example, they are used in the manufacturing of thermoplastic molding compositions, photographic films, lacquers, protective coating solutions, and in protective strip coatings. For many of these uses it is necessary to blend the cellulosic ester with a plasticizer in order to facilitate compounding and improve flexibility and other properties of the finished product.

Although commercial plasticizers such as dioctyl phthalate have been combined with cellulosic esters of at least two organic acids to form thermoplastic compositions, a plasticizer has not yet been provided that can be blended with these cellulosic esters to form a composition having a completely satisfactory combination of properties, such as tensile properties and film compatibility.

SUMMARY OF THE INVENTION

According to the present invention, there is provided a thermoplastic composition capable of forming compatible films comprising a blend of a cellulosic ester of two organic acids with a copolymer of ethylene and at least one ethylenically unsaturated ester of a fatty acid, said composition comprising between about 40 to 90 percent by weight cellulosic ester and between about 60 to 10 percent by weight copolymer, said copolymer comprising between about 25 to 1 percent by weight ethylene and between about 75 to 99 percent by weight ethylenically unsaturated ester of a fatty acid. This thermoplastic composition forms an unsupported film having excellent tensile properties and film compatibility as illustrated in Table I.

There is provided a lacquer comprising an organic solvent solution of the thermoplastic composition.

There is provided a material having coated thereon the thermoplastic composition.

DESCRIPTION OF PREFERRED EMBODIMENTS

The compositions of this invention can readily be prepared and applied by any of the well-known and conventional methods for preparing and applying conventional cellulosic ester lacquer compositions. For example, it is merely necessary to dissolve and homogeneously blend together the cellulosic ester and copolymer of ethylene and ethylenically unsaturated ester of a saturated fatty acid, in an amount between about 40 to 90, preferably 50 to 85, percent by weight cellulosic ester and 60 to 10, preferably 50 to 15, percent by weight copolymer, together with any desired permissive additive, in a typical and conventional volatile cellulosic ester lacquer solvent, e.g., toluene, butyl acetate, acetone, ethanol, or butanol, or solvent mixture. The resulting lacquer solution can then be applied to the surface of a material, e.g., paper, cellophane, paperboard, cloth, metal, leather, rubber, or wood, by spraying, dipping, roller coating, spreading with a doctor blade or rod, printing, or the like. The lacquer solution can then be air dried at ambient and/or elevated temperatures to evaporate the volatile solvent and deposit the nonvolatile components of the composition as a homogeneous, adherent coating on the surface of the material.

A broad class of celluosic esters of at least two organic acids is contemplated as useful in the thermoplastic composition of this invention. For example, cellulosic esters of two organic acids such as acetic acid, butyric acid, propionic acid, and phthalic acid are suitable. It is preferred that the organic acids be selected from the group consisting of acetic acid, butyric acid, propionic acid, and phthalic acid, and it is most preferred that the organic acids be selected from the group consisting of acetic acid, butyric acid, and propionic acid. Suitable cellulosic esters include cellulose acetate butyrate, cellulose acetate propionate, cellulose acetate phthalate, and cellulose propionate butyrate. When one of the organic acids selected is acetic acid, it is preferred that the other acid be present in an amount of at least about 38 percent by weight, and most preferably from about 38 to 50 percent by weight.

The copolymers of ethylene and an ethylenically unsaturated ester of a saturated fatty acid which are suitable for the preparation of the novel compositions of this invention are essentially amorphous, high molecular weight solid resins comprising between about 25 to 1, preferably 20 to 10, and most preferably about 16, percent by weight ethylene and between about 75 to 99, preferably 80 to 90, and most preferably 84, percent by weight ethylenically unsaturated ester of a fatty acid.

The copolymers of this invention can be prepared by copolymerizing a mixture of ethylene and the ethylenically unsaturated ester of a saturated fatty acid using catalysts and conditions known to the art. Suitable methods are disclosed in U.S. 2,200,429 issued to Michael W. Perrin, Eric W. Fawcett, John G. Paton and Edmond G. Williams on May 14, 1940, U.S. 2,394,960 issued to Howard S. Young on Feb. 12, 1946, U.S. 2,395,381 issued to Lombard Squires on Feb. 19, 1946, and U.S. 2,703,794, issued to Milton J. Roedel on Mar. 8, 1955.

The ethylenically unsaturated esters of saturated fatty acids which are copolymerized with ethylene to produce the copolymers of this invention have the general formula RCOOR' in which R is selected from the group consisting of hydrogen and straight- or branched-chain alkyl radicals and R' is an alkenyl radical having a terminal $CH_2=C<$ group. Suitable alkyl radicals are those containing from 1 to about 18 carbon atoms, and preferably from 1 to about 6 carbon atoms, and include by way of example methyl, ethyl, propyl, isopropyl, butyl, isobutyl, secondary butyl, tertiary butyl, and straight- and branched-chain amyl, hexyl, heptyl, octyl, nonyl, decyl, undecyl, dodecyl, octadecyl, and the like, radicals. Suitable alkenyl radicals are those having from 2 to about 6 carbon atoms, and include by way of example vinyl, allyl, isopropenyl, butenyl, pentenyl, hexenyl, heptenyl, octenyl, nonenyl, undecenyl, and dodecenyl radicals having a terminal $CH_2=C<$ group. Illustrative of typical ethylenically unsaturated esters of saturated fatty acids suitable for the purposes of this invention are vinyl formate, vinyl acetate, vinyl propionate, allyl acetate, allyl propionate, isopropenyl butyrate, hexenyl acetate, pentenyl hexanoate, allyl octanoate, nonenyl pentanoate, decenyl acetate, vinyl decanoate, propenyl undecanoate, vinyl dodecanoate, dodecenyl propionate, vinyl stearate, and the like. Copolymers of ethylene and vinyl acetate are preferred.

If and when desired, various conventional additives such as fillers, pigments, dyes, plasticizers, resins, waxes, and the like, can be incorporated into the compositions of this invention in small amounts sufficient to effect special effects, such as coloring or moistureproofing, or heat sealing, or enhanced gloss, or the like. Generally, however, the total amount of such permissive conventional additives will not exceed about 50 percent by weight, and preferably will not exceed about 30 percent by weight of the cellulosic ester and copolymer of ethylene and ethylenically unsaturated ester of a saturated fatty acid. In no case, moreover, will such permissive additive be employed in an amount which can deleteriously affect to any substantial degree the desirable characteristics of the thermoplastic composition of this invention.

The following examples will serve to illustrate the invention. All parts and percentages are by weight unless otherwise indicated.

EXAMPLE 1

The following cellulose acetate butyrate lacquer was prepared:

| Ingredients: | Parts by weight |
|---|---|
| Cellulose acetate butyrate | 57.4 |
| Copolymer of ethylene and vinyl acetate | 10.1 |
| Solvent | 273.0 |

The cellulose acetate butyrate contained butyryl in an amount of 38% by weight and had an ASTM 5/16 inch falling ball viscosity characteristic of ½ second measured on a 12.2% by weight solution of the cellulose acetate butyrate in a solvent composed of 55% toluene, 25% denatured ethyl alcohol, and 20% ethyl acetate by weight at 25° C., noting the time in seconds for a 5/16 inch steel ball to fall freely 10 inches through the solution.

The copolymer of ethylene and vinyl acetate had a weight ratio of ethylene to vinyl acetate of 16:84, and a melt index of 400, determined on a Tinius-Olsen Testing Machine: g./10 minutes at 125° C., 325 g.; computed to 190° C., 2160 g.

The solvent consisted of the following:

| Ingredients: | Parts by weight |
|---|---|
| Acetone | 252 |
| 95% ethanol | 42 |
| Butyl acetate | 63 |
| Toluene | 63 |

Thick (approximately 10 mils) and thin (approximately 2 mils) films were prepared and examined for compatibility. Films were deemed compatible if they were optically clear, soft, and strong; and incompatible if they were opaque or hazy, blushed on extension, or were cheesy. These films were compatible as shown in Table I.

Tensile properties of the plasticized blend were determined with an Instron tester by using microtensile specimens die-cut from pressed 0.050 inch films following the procedure described in ASTM D 1708-59T. The specimens were allowed to stand for at least 24 hours in order to equilibrate with the atmosphere, 50% relative humidity at 73° F. As shown in Table I, the specimens had a tensile strength p.s.i. of 6800, an elongation percent of 7, and an initial modulus p.s.i. of 244,000.

EXAMPLES 2–10

Cellulose acetate butyrate and cellulose acetate propionate lacquers were prepared essentially the same as in Example 1. Important variables are set forth in Table 1. The amount of solvent employed was sufficient to form a lacquer solution containing about 20% total solids. Tensile properties and film compatibility were determined as in Example 1, and are set forth in Table I.

COMPARATIVE EXAMPLES 11–23

Cellulose acetate butyrate and cellulose acetate propionate lacquers were prepared essentially the same as in Example 1. Important variables are set forth in Table I. The amount of solvent employed was sufficient to form a lacquer solution containing about 20% total solids. Tensile properties and film compatibility were determined as in Example 1 and are set forth in Table I.

TABLE I

| Example | Cellulosic resin [1] | Plasticizer | Wt. percent plasticizer [2] | Wt. percent VAc/MI [3] | Tensile strength, p.s.i. | Elongation, percent | Initial modulus, p.s.i. | Film compatibility |
|---|---|---|---|---|---|---|---|---|
| 1 | Cellulose acetate butyrate (38% butyryl). | Copolymer of ethylene and vinyl acetate. | 15 | 84/400 | 6,800 | 7 | 244,000 | Compatible. |
| 2 | do | do | 25 | 84/400 | 6,000 | 7 | 212,000 | Do. |
| 3 | do | do | 50 | 84/400 | 2,950 | 37 | 47,000 | Do. |
| 4 | do | do | 75 | 84/400 | 930 | 254 | 4,550 | |
| 5 | Cellulose acetate butyrate (50% butyryl). | do | 15 | 84/400 | 5,000 | 6 | 200,000 | Do. |
| 6 | do | do | 25 | 84/400 | 3,800 | 19 | 125,000 | Do. |
| 7 | do | do | 50 | 84/400 | 2,500 | 85 | 21,000 | Do. |
| 8 | Cellulose acetate propionate | do | 15 | 84/400 | 6,600 | 8 | 232,000 | Do. |
| 9 | do | do | 25 | 84/400 | 6,000 | 10 | 200,000 | Do. |
| 10 | do | do | 50 | 84/400 | 3,200 | 35 | 59,000 | Do. |
| 11 | Cellulose acetate butyrate (38% butyryl) | do | 15 | 72/230 | 3,900 | 2 | 216,000 | Incompatible. |
| 12 | do | do | 25 | 72/230 | 4,800 | 4 | 182,000 | Do. |
| 13 | Cellulose acetate butyrate (50% butyryl) | do | 15 | 72/230 | 4,900 | 6 | 175,000 | Do. |
| 14 | do | do | 25 | 72/230 | 3,300 | 13 | 91,000 | Do. |
| 15 | Cellulose acetate propionate | do | 15 | 72/230 | 5,200 | 4 | 211,000 | Do. |
| 16 | do | do | 25 | 72/230 | 1,400 | 166 | 1,283 | Do. |
| 17 | Cellulose acetate butyrate (38% butyryl) | Dioctyl phthalate | 50 | | 567 | 15 | 20,000 | |
| 18 | Cellulose acetate butyrate (50% butyryl) | do | 15 | | 2,500 | 18 | 104,000 | |
| 19 | do | do | 25 | | 1,600 | 30 | 42,000 | |
| 20 | do | do | 50 | | 350 | 52 | 1,300 | |
| 21 | Cellulose acetate propionate | do | 15 | | 5,000 | 7 | 153,000 | |
| 22 | do | do | 25 | | 3,500 | 8 | 106,000 | |
| 23 | do | do | 50 | | 925 | 6 | 24,000 | |

[1] The cellulosic resins had an ASTM 5/16-inch falling ball viscosity characteristic of ½ second, measured as in Example 1.
[2] Wt. percent plasticizer was the wt. percent of plasticizer to the total wt. of plasticizer and cellulosic resin.
[3] Wt. percent of VAc was the wt. percent of VAc in the ethylene/VAC copolymer.

What is claimed is:

1. A thermoplastic composition capable of forming compatible films comprising a blend of a cellulosic ester of two organic acids, selected from the group consisting of acetic acid, butyric acid, propionic acid and phthalic acid, with a copolymer of ethylene and at least one ethylenically unsaturated ester of a fatty acid having the general formula RCOOR' in which R is hydrogen or an alkyl radical containing 1–18 carbon atoms and R' is an alkenyl radical containing 2–6 carbon atoms and having a terminal $CH_2=C<$ group, said composition comprising between about 40 to 90 percent by weight cellulosic ester and between about 60 to 10 percent by weight copolymer, said copolymer comprising between about 25 to 1 percent by weight ethylene and between about 75 to 99 percent by weight ethylenically unsaturated ester of a fatty acid.

2. The composition of claim 1 wherein said copolymer is a copolymer of ethylene and vinyl acetate.

3. The composition of claim 2 wherein said copolymer comprises between about 20 to 10 percent by weight ethylene and between about 80 to 90 percent by weight vinyl acetate.

4. The composition of claim 3 wherein said copolymer comprises about 16 percent by weight ethylene and about 84 percent by weight vinyl acetate.

5. The composition of claim 2 wherein said composition comprises between about 50 to 85 percent by weight cellulosic ester and between about 50 to 15 percent by weight copolymer.

6. The composition of claim 2 wherein said organic acids are selected from the group consisting of acetic acid, butyric acid, and propionic acid.

7. The composition of claim 6 wherein one of said acids is acetic acid and the other said acid is present in an amount of at least about 38 percent by weight.

8. The composition of claim 7 wherein said cellulosic ester is cellulose acetate butyrate.

9. The composition of claim 7 wherein said cellulosic ester is cellulosic acetate propionate.

10. A thermoplastic composition capable of forming compatible films comprising a blend of a cellulosic ester of two organic acids selected from the group consisting of acetic acid, butyric acid, and propionic acid with a copolymer of ethylene and vinyl acetate, said composition comprising between about 50 to 85 percent by weight cellulosic ester and between about 50 to 15 percent by weight copolymer, said copolymer comprising between about 20 to 10 percent by weight ethylene and between about 80 to 90 percent by weight vinyl acetate.

11. The composition of claim 10 wherein said cellulosic ester is cellulose acetate butyrate having a butyryl content of at least 38 percent.

12. A lacquer comprising an organic solvent selected from the group consisting of toluene, butyl acetate, acetone, ethanol, butanol and mixtures thereof and the thermoplastic composition of claim 2.

13. A lacquer comprising an organic solvent selected from the group consisting of toluene, butyl acetate, acetone, ethanol, butanol and mixtures thereof and the thermoplastic composition of claim 10.

14. A lacquer comprising an organic solvent selected from the group consisting of toluene, butyl acetate, acetone, ethanol, butanol and mixtures thereof and the thermoplastic composition of claim 11.

15. A material selected from the group consisting of paper, paperboard and wood having coated thereon the claim 2.

16. A material selected from the group consisting of paper, paperboard and wood having coated thereon the composition of claim 10.

17. A material selected from the group consisting of paper, paperboard and wood having coated thereon the composition of claim 11.

References Cited

UNITED STATES PATENTS

| | | | |
|---|---|---|---|
| 2,703,794 | 3/1955 | Roedel | 260—87.3 |
| 3,370,025 | 2/1968 | Salo et al. | 260—15 |
| 3,382,092 | 5/1968 | Ilnyckyj et al. | 117—97 |
| 3,429,840 | 2/1969 | Lowe et al. | 260—15 |
| 3,503,909 | 3/1970 | Bowman et al. | 260—17 |

WILLIAM H. SHORT, Primary Examiner

L. M. PHYNES, Assistant Examiner

U.S. Cl. X.R.

260—87.3